(12) United States Patent
Inoue et al.

(10) Patent No.: US 12,173,155 B2
(45) Date of Patent: Dec. 24, 2024

(54) SILICONE EMULSION COMPOSITION

(71) Applicant: SHIN-ETSU CHEMICAL CO., LTD., Tokyo (JP)

(72) Inventors: Natsumi Inoue, Annaka (JP); Tetsuro Yamada, Annaka (JP); Kenji Yamamoto, Annaka (JP); Tsuneo Kimura, Annaka (JP); Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 632 days.

(21) Appl. No.: 17/284,666

(22) PCT Filed: Aug. 28, 2019

(86) PCT No.: PCT/JP2019/033677
§ 371 (c)(1),
(2) Date: Apr. 12, 2021

(87) PCT Pub. No.: WO2020/090209
PCT Pub. Date: May 7, 2020

(65) Prior Publication Data
US 2021/0355324 A1 Nov. 18, 2021

(30) Foreign Application Priority Data
Oct. 29, 2018 (JP) ................................ 2018-202983

(51) Int. Cl.
| | | |
|---|---|---|
| *C08L 83/04* | (2006.01) | |
| *C08G 77/08* | (2006.01) | |
| *C08G 77/12* | (2006.01) | |
| *C08G 77/14* | (2006.01) | |
| *C08G 77/20* | (2006.01) | |
| *C08K 5/5435* | (2006.01) | |
| *C08L 29/04* | (2006.01) | |

(52) U.S. Cl.
CPC .............. *C08L 83/04* (2013.01); *C08G 77/08* (2013.01); *C08G 77/12* (2013.01); *C08G 77/14* (2013.01); *C08G 77/20* (2013.01); *C08K 5/5435* (2013.01); *C08L 29/04* (2013.01); *C08L 2201/52* (2013.01); *C08L 2203/16* (2013.01); *C08L 2205/02* (2013.01); *C08L 2205/03* (2013.01)

(58) Field of Classification Search
CPC ........ C08G 77/08; C08G 77/12; C08G 77/14; C08G 77/20; C08L 83/04; C08L 2201/52; C08L 2203/16; C08L 2205/02; C08L 2205/00; C08K 5/5435
See application file for complete search history.

(56) References Cited

U.S. PATENT DOCUMENTS

| | | | |
|---|---|---|---|
| 3,900,617 A | 8/1975 | Grenoble | |
| 5,095,067 A | 3/1992 | Hara et al. | |
| 5,500,148 A | 3/1996 | Ohba et al. | |
| 5,728,339 A | 3/1998 | Farrar | |
| 8,729,195 B2* | 5/2014 | Taniguchi | ............. C07F 7/1804 528/31 |
| 2003/0134131 A1 | 7/2003 | Yamamoto et al. | |
| 2006/0280957 A1 | 12/2006 | Lee et al. | |
| 2012/0101227 A1 | 4/2012 | Galeone et al. | |
| 2012/0156269 A1 | 6/2012 | Simonnet et al. | |
| 2012/0309921 A1 | 12/2012 | Taniguchi et al. | |
| 2013/0030380 A1 | 1/2013 | Abe et al. | |
| 2014/0031764 A1 | 1/2014 | Abe et al. | |
| 2016/0376475 A1 | 12/2016 | Huang et al. | |
| 2018/0094178 A1* | 4/2018 | Yamamoto | ........... C09D 183/12 |

FOREIGN PATENT DOCUMENTS

| | | |
|---|---|---|
| CN | 101892115 A | 11/2010 |
| CN | 102414276 A | 4/2012 |
| CN | 102481234 A | 5/2012 |
| CN | 102821804 A | 12/2012 |
| CN | 102850930 A | 1/2013 |
| CN | 103582498 A | 2/2014 |
| CN | 108485594 A | 9/2018 |
| EP | 2554205 A1 | 2/2013 |
| JP | S54-52160 A | 4/1979 |
| JP | S57-53143 B2 | 11/1982 |
| JP | S63-314275 A | 12/1988 |

(Continued)

OTHER PUBLICATIONS

Machine translation of JP-2010209269-A to Kimura et al., published Sep. 24, 2010 (Year: 2010).*
May 11, 2023 Office Action issued in Taiwanese Patent Application No. 108133198.
Handbook of Practical Plastic Packaging Products, Films, Containers, Woven Bags, Turnover Boxes, Buffer Materials, Printing Technology, Jul. 3, 2000.
May 26, 2022 Office Action and Search Report in Chinese Patent Application No. 201980070649.1.
Feb. 3, 2023. Office Action issued in Chinese Patent Application No. 201980070649.1.
Aug. 12, 2022 Extended European Search Report issued in European Patent Application No. 19877602.3.

(Continued)

*Primary Examiner* — Jane L Stanley
(74) *Attorney, Agent, or Firm* — Oliff PLC

(57) ABSTRACT

An addition reaction-curable silicone emulsion composition containing a water-soluble silane coupling agent (I) and an organopolysiloxane (II) having at least two alkenyl groups in one molecule thereof, where the water-soluble silane coupling agent (I) has at least one group selected from among a succinic anhydride group, a quaternary ammonium group, and a ureido group, and 1 part by mass or more of the water-soluble silane coupling agent (I) is contained relative to 100 parts by mass of the organopolysiloxane (II). This provides: a silicone emulsion composition that gives a cured film adhering well to plastic film substrates regardless of the type, while having suitable release properties regarding adhesives; and a delamination film made by forming a cured film of the silicone emulsion composition.

4 Claims, No Drawings

(56) References Cited

FOREIGN PATENT DOCUMENTS

| | | |
|---|---|---|
| JP | H106-57144 A | 3/1994 |
| JP | H07-57862 B2 | 6/1995 |
| JP | H11-222557 A | 8/1999 |
| JP | 2001-055510 A | 2/2001 |
| JP | 3664831 B2 | 6/2005 |
| JP | 3824072 B2 | 9/2006 |
| JP | 2010209269 A * 9/2010 ............ C08L 83/06 |
| JP | 2011-137103 A | 7/2011 |
| JP | 5074682 B2 | 11/2012 |
| JP | 2012-531455 A | 12/2012 |
| JP | 2012-532210 A | 12/2012 |
| JP | 2013-191687 A | 9/2013 |
| JP | 2014-214249 A | 11/2014 |
| JP | 2015-203105 A | 11/2015 |
| JP | 2017-504674 A | 2/2017 |
| JP | 6130230 B2 | 5/2017 |
| KR | 2012-0099282 A | 9/2012 |
| KR | 2017-0133467 A | 12/2017 |

OTHER PUBLICATIONS

Oct. 26, 2022 Office Action issued in Chinese Patent Application No. 201980070649.1.
Aug. 24, 2021 Office Action issued in Japanese Patent Application No. 2018-202983.
Oct. 29, 2019 Search Report issued in International Patent Application No. PCT/JP2019/033677.
Apr. 27, 2021 International Preliminary Report on Patentability issued in International Patent Application No. PCT/ JP2019/ 033677.
Jul. 24, 2024 Office Action issued in Korean Patent Application No. 2021-7012351.

* cited by examiner

SILICONE EMULSION COMPOSITION

TECHNICAL FIELD

The present invention relates to: an addition reaction-curable silicone emulsion composition with favorable adhesion to a plastic film substrate; and a delamination film using this composition.

BACKGROUND ART

Conventionally, various silicone compositions are known as silicone compositions for release paper used on a substrate such as paper and plastic, and among these, solvent based silicones have been widely used in view of release properties and for being usable for a comparatively large variety of substrates.

However, in recent years, it has become necessary to take measures such as reducing solvent usage and collecting used solvents so as not to discharge the solvents to the outside from aspects of environmental pollution, safety, and hygiene, etc. Among these, using solvent free silicones is effective as a method for reducing solvent usage. However, in order to apply these to paper, laminated paper, and plastic film substrate uniformly with a film thickness of 0.1 to 1.0 g/m$^2$, an expensive application apparatus and technique are needed, and changing from a solvent based silicone to a solvent free silicone is generally not a method that can be easily adopted. When applying at 1.0 g/m$^2$ or more, solvent free silicone is not favorable due to an increase in production costs.

Other effective means for reducing solvent usage include a means of using an emulsion type silicone. This type of silicone has been conventionally used, and the following are known: a silicone obtained by mixing an emulsion composed of an organovinylpolysiloxane, a platinum compound, an emulsifier, and water with an emulsion composed of an organohydrogenpolysiloxane, an emulsifier, and water (Patent Document 1); a silicone produced by emulsion polymerization (Patent Document 2); a silicone obtained by emulsifying an organovinylsiloxane and an organohydrogensiloxane using a certain emulsifier and mixing with an emulsion of a platinum compound (Patent Document 3); or the like.

Since these silicones can be optionally diluted with water, an expensive application apparatus and technique for thin film application are not necessary as opposed to the solvent free type, and there is an advantage that the silicones can be used like the solvent based type.

However emulsion type silicones have not been widely used because of drawbacks associated with having water as a dispersion medium. One drawback is that high temperature cure is necessary due to the high latent heat of the evaporation of water, and poor curability is indicated as compared with the solvent based and solvent free types. Another drawback is that emulsion type silicones have poor wettability and poor adhesiveness to substrates due to high surface tension of water. These drawbacks become serious problems especially with plastic film substrates, and can be said to be a cause for hardly being used.

Many proposals for improvement have been made to solve these problems. Examples include using an organopolysiloxane having alkenyl groups at molecular ends (Patent Document 4), blending an emulsion of a non-silicone polymer (Patent Document 5), and the like. However, most of these improvements are intended for paper substrates, and sufficient adhesiveness cannot be achieved when applied to plastic film substrates.

In addition, as a means for improving adhesiveness, providing a base polymer with a branched structure containing an RSiO$_{3/2}$ unit (Patent Document 6) is reported. Although this provides good adhesion to various plastic substrates, an organopolysiloxane containing a large amount of trifunctional siloxane units and alkenyl groups needs to take up 50 mass % or more as an adhesion exhibiting component, and it has been difficult to achieve a sufficiently light release to adhesives (make it easier to peel) when attempting to raise adhesiveness further.

As a means for improving adhesiveness by using a silane coupling agent, it is possible to use a glycidoxy silane (Patent Document 7), but this is mainly applied for in-line purposes. In addition, a method of improving adhesiveness by using an undercoating layer formed using a coating solution containing a silane coupling agent (Patent Document 8) is reported, but the number of steps becomes increased since extension is performed after forming the undercoating layer. Furthermore, a method of using a silane having an epoxycyclohexyl group (Patent Document 9), a method of using an additive which is a reaction product of a liquid polyorganosiloxane containing at least one alkenyl group and at least one silanol group with a hydrolysable silane containing at least one epoxide group (Patent Document 10), and the like are reported. However, silane coupling agents are often limited to those containing epoxy groups.

As described above, hardly any suggestions have been made for a silicone emulsion that can achieve satisfactory adhesiveness when applied to a plastic film substrate, and it can be said that none are provided for practical use.

CITATION LIST

Patent Literature

Patent Document 1: JP S57-53143 B
Patent Document 2: JP S54-52160 A
Patent Document 3: JP S63-314275 A
Patent Document 4: JP H6-57144 A
Patent Document 5: JP H11-222557 A
Patent Document 6: JP 3824072 B
Patent Document 7: JP H7-57862 B
Patent Document 8: JP 6130230 B
Patent Document 9: JP 5074682 B
Patent Document 10: JP 2017-504674 A

SUMMARY OF INVENTION

Technical Problem

The present invention has been made to solve the above-described problems, and an object thereof is to provide: a silicone emulsion composition that gives a cured film adhering well to plastic film substrates regardless of the type, while having suitable release properties regarding adhesives; and a delamination film made by forming a cured film of the silicone emulsion composition.

Solution to Problem

To achieve the object, the present invention provides an addition reaction-curable silicone emulsion composition comprising a water-soluble silane coupling agent (I) and an organopolysiloxane (II) having at least two alkenyl groups in one molecule thereof, wherein the water-soluble silane coupling agent (I) has at least one group selected from among a succinic anhydride group, a quaternary ammonium group, and a ureido group, and 1 part by mass or more of the water-soluble silane coupling agent (I) is contained relative to 100 parts by mass of the organopolysiloxane (II).

The inventive addition reaction-curable silicone emulsion composition can give a cured film that adheres well to plastic film substrates regardless of the type, while having suitable release properties regarding adhesives.

In this case, the water-soluble silane coupling agent (I) is preferably represented by the following general formula (Ia),

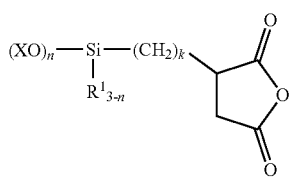

wherein $R^1$ represents a monovalent hydrocarbon group having 1 to 10 carbon atoms and "n" represents 2 or 3; X represents a monovalent hydrocarbon group having 1 to 4 carbon atoms; and "k" represents an integer of 2 to 20.

Such an addition reaction-curable silicone emulsion composition allows further improvement of adhesiveness to plastic film substrates.

Furthermore, the inventive addition reaction-curable silicone emulsion composition preferably contains the following (1) to (6):

(1) 1 to 20 parts by mass of the water-soluble silane coupling agent (I), (2) 100 parts by mass of the organopolysiloxane (II) represented by the following general formula (II-1) and having absolute viscosity at 25° C. within a range of 10 mPa·s to 50000 mPa·s with 30% toluene diluted viscosity, wherein each $R^2$ is the same or different, and represents a group selected from an unsubstituted or substituted monovalent hydrocarbon group having 1 to 20 carbon atoms and no aliphatic unsaturated bond and an alkenyl group having 2 to 12 carbon atoms optionally having an intervening oxygen atom, and at least two of the $R^2$ represent alkenyl groups; and "p", "q", r1, r2, "s", and "t" satisfy $10 \leq p \leq 30,000$, $0 \leq q$, $r1$, $r2 \leq 500$, and $0 \leq s+t \leq 20$, (3) 1 to 30 parts by mass of an organohydrogenpolysiloxane (III) having at least two hydrogen atoms directly bonded to a Si atom in one molecule thereof, (4) 0.1 to 20 parts by mass of a surfactant (IV) relative to 100 parts by mass of a total amount of the organopolysiloxane (II) and the organohydrogenpolysiloxane (III), (5) a catalytic amount of a platinum group metal-based catalyst (V), and (6) 100 to 10000 parts by mass of water (VI).

Such an addition reaction-curable silicone emulsion composition can give a cured film that adheres more favorably to plastic film substrates, and that has excellent release properties regarding adhesives.

In addition, the present invention provides a delamination film having a cured film of the above-described addition reaction-curable silicone emulsion composition formed on a plastic film.

Such a delamination film has a cured film that adheres well to plastic film substrates while having suitable release properties regarding adhesives, and therefore, has high practicality.

Advantageous Effects of Invention

As described above, the inventive addition reaction-curable silicone emulsion composition can be cured to obtain a cured film that can be adhered well to a plastic film substrate regardless of the type of the film substrate. Furthermore, this cured film can be used for a delamination film since the cured film has suitable release properties regarding adhe-

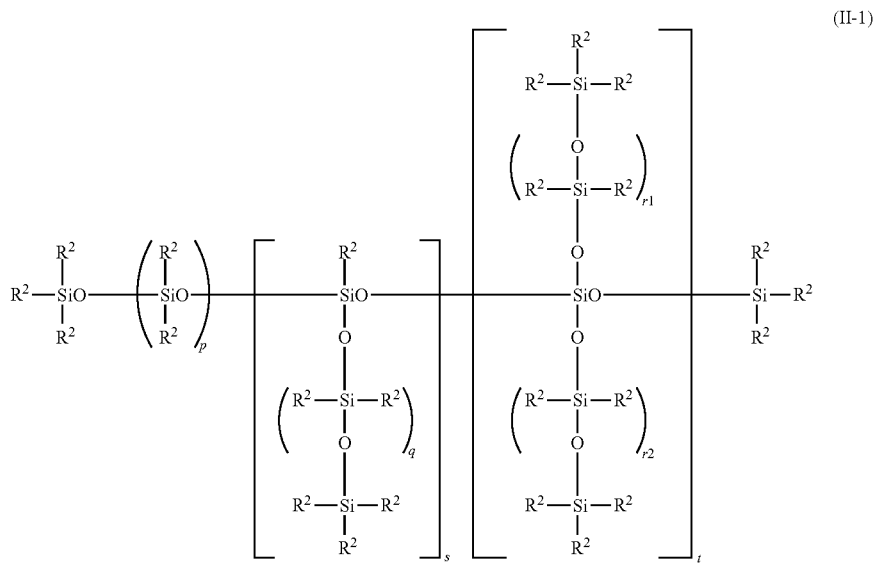

sives. Furthermore, a delamination film obtained by applying the above-described silicone emulsion composition to a plastic film and curing has a cured film formed that adheres well to plastic film substrates while having suitable release properties regarding adhesives, and therefore, has high practicality.

DESCRIPTION OF EMBODIMENTS

As described, it has been desired to develop a silicone emulsion composition that gives a cured film that adheres well to plastic film substrates regardless of the type, while having suitable release properties regarding adhesives.

Accordingly, in order to solve the above problems, the present inventors have earnestly studied and found out that a silicone emulsion composition obtained by adding a water-soluble silane coupling agent to an alkenyl group-containing organopolysiloxane adheres well to plastic film substrates, and came to complete the present invention.

That is, the present invention is an addition reaction-curable silicone emulsion composition comprising a water-soluble silane coupling agent (I) and an organopolysiloxane (II) having at least two alkenyl groups in one molecule thereof, wherein
the water-soluble silane coupling agent (I) has at least one group selected from among a succinic anhydride group, a quaternary ammonium group, and a ureido group, and 1 part by mass or more of the water-soluble silane coupling agent (I) is contained relative to 100 parts by mass of the organopolysiloxane (II).

Hereinafter, the present invention will be described in detail. However, the present invention is not limited thereto.
[Silicone Emulsion Composition]

The inventive silicone emulsion composition is cured by addition reaction (addition reaction-curable), contains a water-soluble silane coupling agent (I) and an organopolysiloxane (II) having at least two alkenyl groups in one molecule thereof, where the water-soluble silane coupling agent (I) has at least one group selected from among a succinic anhydride group, a quaternary ammonium group, and a ureido group, and 1 part by mass or more of the water-soluble silane coupling agent (I) is contained relative to 100 parts by mass of the organopolysiloxane (II).

The inventive addition reaction-curable silicone emulsion composition contains the above-described water-soluble silane coupling agent (I), and therefore, favorable adhesiveness can be achieved even with a plastic film substrate with which sufficient adhesiveness cannot be achieved by addition of a conventionally-used epoxy group-containing silane coupling agent. In addition, a cured film obtained by curing the inventive composition can maintain sufficient adhesiveness to plastic substrates, while achieving a sufficiently light release to adhesives (making it easier to peel).

In addition to the above-described water-soluble silane coupling agent (I) and organopolysiloxane (II) having at least two alkenyl groups in one molecule thereof, the inventive addition reaction-curable silicone emulsion composition can contain an organohydrogenpolysiloxane (III) having at least two hydrogen atoms each directly bonded to a Si atom in one molecule thereof, a surfactant (IV), a catalytic amount of a platinum group metal-based catalyst (V), and water (VI). Hereinafter, each of the above-described components will be described in detail.
[Water-Soluble Silane Coupling Agent (I)]

The water-soluble silane coupling agent (I) of the present invention is not particularly limited as long as at least one group selected from among a succinic anhydride group, a quaternary ammonium group, and a ureido group is contained. The water-soluble silane coupling agent (I) can also contain a hydroxy group, a carboxylic acid group, an amino group, or the like as a group other than the above-described groups. Examples include groups represented by the following general formula.

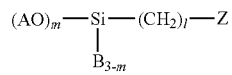

In the formula, "B" represents a substituted or unsubstituted monovalent hydrocarbon group having 1 to 10 carbon atoms, and "m" represents 2 or 3. "A" represents a substituted or unsubstituted monovalent hydrocarbon group having 1 to 4 carbon atoms. "l" represents an integer of 2 to 20. "Z" represents a succinic anhydride group, a quaternary ammonium group, or a ureido group.

In addition, the water-soluble silane coupling agent (I) can have a hydrolyzed structure or a condensed structure. Examples include a co-hydrolysis product of a glycidoxyalkyltrialkoxysilane and a tetraalkylammonium salt substituted with a trialkoxysilane, and a co-hydrolysis product of an aminoalkyltrialkoxysilane and a ureidoalkyltrialkoxysilane.

The water-soluble silane coupling agent (I) is preferably represented by the following general formula

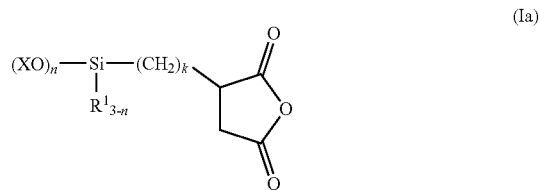

In the formula (Ia), $R^1$ represents a monovalent hydrocarbon group having 1 to 10, preferably 1 to 6 carbon atoms. Specific examples include: alkyl groups such as a methyl group, an ethyl group, a propyl group, an isopropyl group, a butyl group, an isobutyl group, a tert-butyl group, a pentyl group, a neopentyl group, a hexyl group, and an octyl group; cycloalkyl groups such as a cyclohexyl group; alkenyl groups such as a vinyl group, an allyl group, and a propenyl group; aryl groups such as a phenyl group, a tolyl group, a xylyl group, and a naphthyl group; aralkyl groups such as a benzyl group, a phenylethyl group, and a phenylpropyl group; and the like. In particular, a methyl group, an ethyl group, and a phenyl group are preferable. In addition, "n" represents 2 or 3. The silane coupling agent where "n" represents 2 or 3 is preferable since the number of silanols generated by hydrolysis becomes sufficient so that the silane coupling agent has high solubility in water, sufficient stability of the aqueous solution, and high reaction efficiency with inorganic materials.

X represents a monovalent hydrocarbon group having 1 to 4 carbon atoms, and specific examples include alkyl groups such as a methyl group, an ethyl group, a propyl group, an isopropyl group, a butyl group, an isobutyl group, and a tert-butyl group. In particular, a methyl group and an ethyl group are preferable.

In the formula (Ia), "k" represents an integer of 2 to 20, preferably 2 to 10, and from an industrial viewpoint, k=3 is more preferable.

Specific examples of a silane coupling agent containing a succinic anhydride group include, trimethoxysilylpropyl succinic anhydride, triethoxysilylpropyl succinic anhydride, methyldimethoxysilylpropyl succinic anhydride, methyldiethoxysilylpropyl succinic anhydride, and the like, but the examples are not limited to those shown here.

In addition, the water-soluble silane coupling agent (Ia) includes those having a hydrolyzed structure and those having a condensed structure.

Reasons why the inventive addition reaction-curable silicone emulsion composition gives a cured film that adheres well to plastic film substrates regardless of the type are not necessarily clear. However, it can be considered: the water-soluble silane coupling agent (I) has at least one group selected from among a succinic anhydride group, a quaternary ammonium group, and a ureido group, these groups exhibit affinity to the film surface, and the silyl group side is bonded to a silicone layer, so that adhesiveness is enhanced.

In particular, it can be considered that by the addition of the water-soluble silane coupling agent (Ia), the succinic anhydride group exhibits a strong affinity to the film surface and an alkoxysilyl group makes a bond with the silicone layer, so that adhesiveness to the film is enhanced.

The inventive addition reaction-curable silicone emulsion composition contains 1 part by mass or more of the water-soluble silane coupling agent (I) relative to 100 parts by mass of the organopolysiloxane (II). With less than 1 part by mass, a cured film having sufficient adhesiveness to plastic film substrates cannot be obtained. On the other hand, the upper limit of the blended amount of the water-soluble silane coupling agent (I) is not particularly limited and can be determined according to the substrate, but is preferably 30 parts by mass or less, and more preferably 20 parts by mass or less.

[Alkenyl Group-Containing Organopolysiloxane (II)]

The alkenyl group-containing organopolysiloxane, being the main component of the inventive silicone emulsion composition, is not particularly limited as long as the organopolysiloxane has at least two alkenyl groups in one molecule thereof, and does not hinder emulsification and stability of the obtained emulsion. Curing does not take place if the alkenyl group is less than two.

The organopolysiloxane represented by the following general formula (II-1) is preferably employed to impart more desirable properties to a delamination film obtained with the inventive silicone emulsion composition.

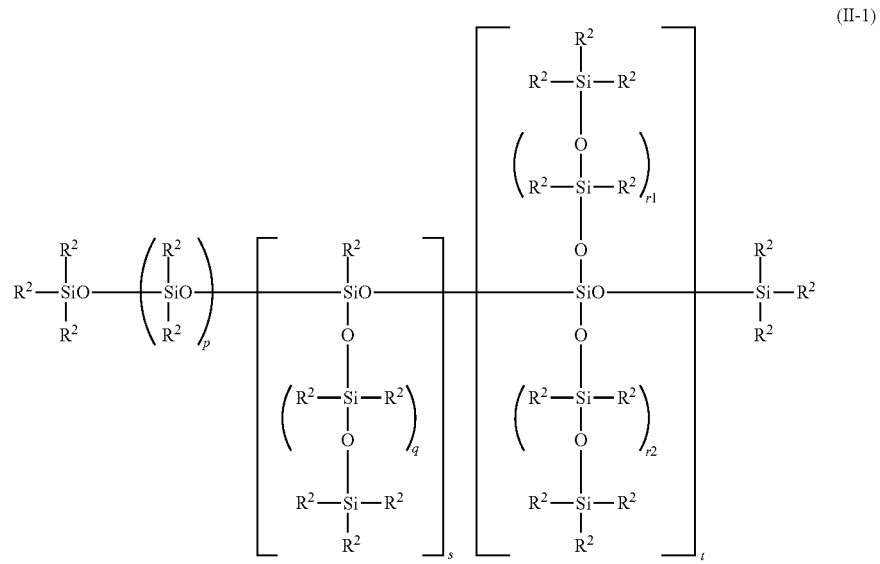

(II-1)

In the formula (II-1), each $R^2$ is the same or different, and represents a group selected from an unsubstituted or substituted monovalent hydrocarbon group having 1 to 20 carbon atoms and no aliphatic unsaturated bond and an alkenyl group having 2 to 12 carbon atoms optionally having an intervening oxygen atom, and at least two of the $R^2$ represent alkenyl groups.

Specific examples of the monovalent hydrocarbon group having 1 to 20 carbon atoms and no aliphatic unsaturated bond include: alkyl groups preferably having 1 to 6 carbon atoms such as a methyl group, an ethyl group, a propyl group, and a butyl group; cycloalkyl groups preferably having 5 to 8 carbon atoms such as a cyclohexyl group; aryl groups preferably having 6 to 10 carbon atoms such as a phenyl group and a tolyl group; aralkyl groups preferably having 7 to 10 carbon atoms such as a benzyl group; and substituted hydrocarbon groups (for example, a hydroxypropyl group, a chloropropyl group, a 3,3,3-trifluoropropyl group, and the like) obtained by substituting some or all of the hydrogen atoms bonded to the carbon atoms of the above hydrocarbon groups with a hydroxy group, an alkoxy group, a polyether group, an alkoxyalkyl group, an epoxy group, a halogen atom, or the like. In particular, from the viewpoint of release property, alkyl groups and aryl groups are preferable, and a methyl group, an ethyl group, a propyl group, and a phenyl group are more preferable.

As the alkenyl group having 2 to 12 carbon atoms optionally having an intervening oxygen atom, a group represented by $-(CH_2)_x-CH=CH_2$, wherein "x" represents 0 or an integer of 1 to 10, is preferable. Specific examples include a vinyl group, a propenyl group, a butenyl group, a hexenyl group, an octenyl group, and a decenyl group. In addition, an ether bond may be included in the methylene chain thereof, and the position where the oxygen atom intervenes, i.e. the position of the ether bond, is not particularly limited. Examples include $-(CH_2)_2-O-$ CH$_2$—CH=CH$_2$, —(CH$_2$)$_3$—O—CH$_2$—CH=CH$_2$, and the like. In particular, a vinyl group is preferable.

In addition, the viscosity of the organopolysiloxane (II-1) is preferably within a range from 10 mPa·s to 50000 mPa·s with 30% toluene diluted viscosity in terms of absolute viscosity at 25° C., more preferably within a range from 50 mPa·s to 30000 mPa·s with 30% toluene diluted viscosity. When the absolute viscosity is 10 mPa·s or higher, storage stability of the silicone emulsion composition becomes high, and when the absolute viscosity is 50000 mPa·s or lower with 30% toluene diluted viscosity, emulsification becomes easy.

"s" and "t" are within the range 0≤s+t≤20; "p", "q", r1, and r2 satisfy 10≤p≤30,000 and 0≤q, r1, r2≤500; and these can be selected so that the organopolysiloxane (II-1) satisfies the above-described viscosity range. An organopolysiloxane (II-1) where s+t is 20 or less can be obtained without gelation during synthesis.

The organopolysiloxane (II) of the present invention can be obtained by known methods for producing an organopolysiloxane. For example, co-hydrolyzing a trialkoxymethylsilane and a dialkenyltetramethyldisiloxane or a hexamethyldisiloxane in an alcohol solvent by using an acid catalyst. Examples of the acid catalyst include sulfuric acid, hydrochloric acid, phosphoric acid, activated clay, iron chloride, boric acid, trifluoroacetic acid, methanesulfonic acid, trifluoromethanesulfonic acid, and the like. The target organopolysiloxane can be obtained by, after neutralizing the reaction product, going through the steps of removing the by-product alcohol and washing with water to remove unreacted materials. An alkali catalyst can be also employed as the catalyst. Alkali catalysts include KOH, CsOH, NaOH, (CH$_3$)$_4$NOH, (n-C$_4$H$_9$)$_4$POH, and metal siliconates of potassium, phosphorous, and the like.

Among the components of the inventive silicone emulsion composition, organopolysiloxane (II) is a component that greatly affects the release force. By altering the structure and substituents of the organopolysiloxane (II), the release properties of a cured film of the silicone emulsion composition can be varied.

The organopolysiloxane (II) does not need to be of a single composition. For example, in the case of an organopolysiloxane (II-1), a mixture of a few organopolysiloxanes having different compositions is possible as long as the average of the multiple components fulfill the requirements of the above-described general formula. Specific examples of the organopolysiloxane (II) include the following, but are not limited thereto. Note that Me, Vi, and Ph in the following formulae each represent a methyl group, a vinyl group, and a phenyl group.

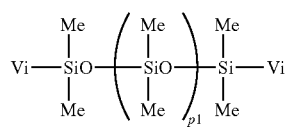

(150≤p1≤2,500)

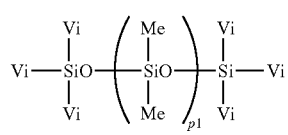

(150≤p1≤10,000)

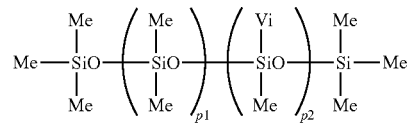

(150≤p1≤19,000, 2≤p2≤500)

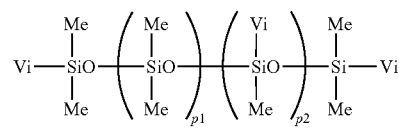

(150≤p1≤19,000, 1≤p2≤500)

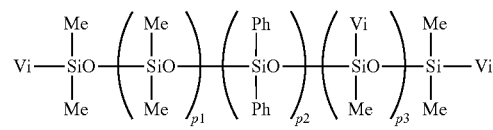

(150≤p1≤19,000, 1≤p2≤500, 1≤p3≤500)

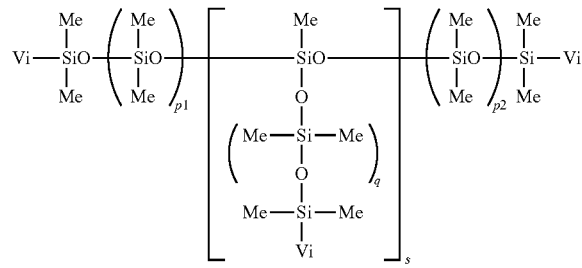

(150≤p1≤5,000, 1≤p2≤5000, 0≤q≤500, 1≤s≤20)

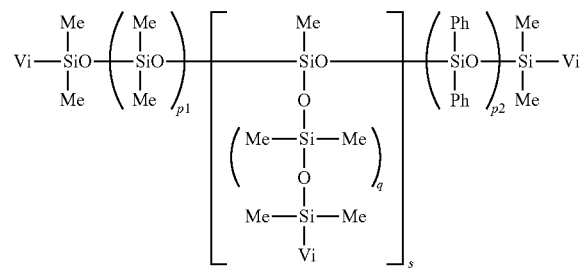

(150≤p1≤5,000, 1≤p2≤500, 0≤q≤500, 1≤s≤20)

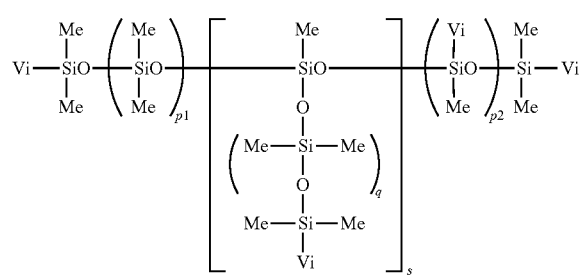

$(150 \leq p1 \leq 5{,}000,\ 1 \leq p2 \leq 500,\ 0 \leq q \leq 500,\ 1 \leq s \leq 20)$

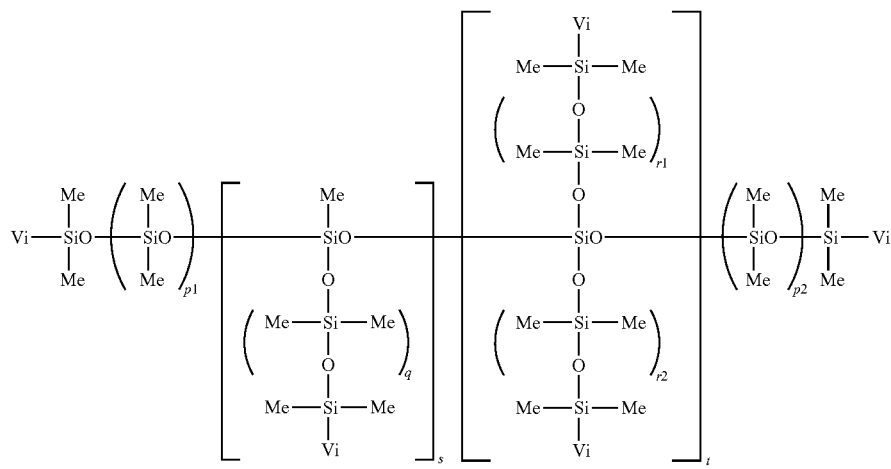

$(150 \leq p1 \leq 5{,}000,\ 0 \leq p2 \leq 5{,}000,\ 0 \leq q \leq 500,\ 0 \leq r1 \leq 500,\ 0 \leq r2 \leq 500,\ 1 \leq s+t \leq 20)$

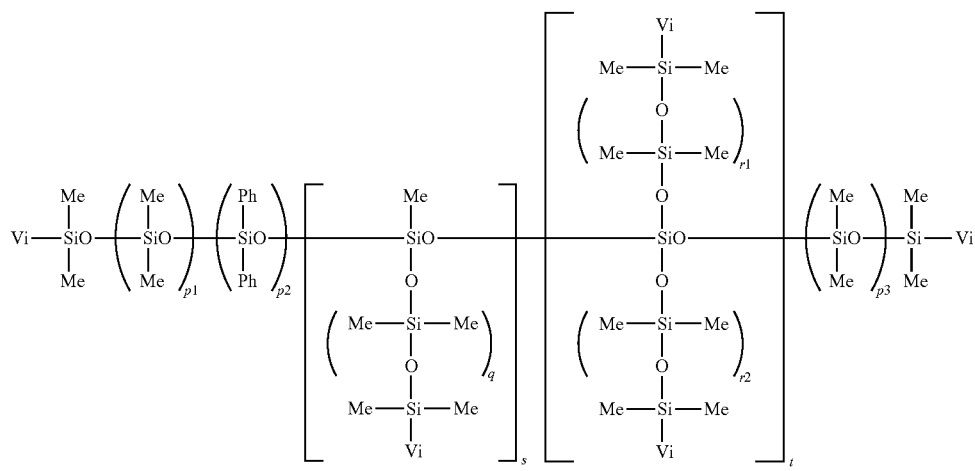

$(150 \leq p1 \leq 5{,}000,\ 1 \leq p2 \leq 500,\ 150 \leq p3 \leq 5{,}000,\ 0 \leq q \leq 500,\ 0 \leq r1 \leq 500,\ 0 \leq r2 \leq 500,\ 1 \leq s+t \leq 20)$

[Organohydrogenpolysiloxane (III)]

The inventive addition reaction-curable silicone emulsion composition can contain an organohydrogenpolysiloxane (III). The organohydrogenpolysiloxane (III) has at least two hydrogen atoms directly bonded to a Si atom (SiH groups) in one molecule thereof. This SiH group undergoes addition reaction with alkenyl groups on the organopolysiloxane (II), and functions as a crosslinking agent for forming a cured film. Two or more SiH groups are contained in one molecule, and the structure of a siloxane unit having the groups is represented by the following formula.

$$R^3{}_a H_b SiO_{(4-a-b)/2} \qquad (III)$$

In the formula (III), $R^3$ represents an unsubstituted or substituted monovalent hydrocarbon group, and specific examples include: alkyl groups preferably having 1 to 6 carbon atoms such as a methyl group, an ethyl group, a propyl group, and a butyl group; cycloalkyl groups preferably having 5 to 8 carbon atoms such as a cyclohexyl group; halogen-substituted alkyl groups such as a 3,3,3-trifluoropropyl group; aryl groups preferably having 6 to 10 carbon atoms such as a phenyl group and a tolyl group; aralkyl groups preferably having 7 to 10 carbon atoms such as a benzyl group; and a hydroxypropyl group, a cyanoethyl group, a 3-chloropropyl group, a 3,3,3-trifluoropropyl group, or the like obtained by substituting some or all of the hydrogen atoms bonded to the carbon atoms of the above hydrocarbon groups with a hydroxy group, a cyano group, a halogen atom, or the like. In particular, alkyl groups and aryl groups are preferable, and from the viewpoint of enhancing addition reaction rate, a methyl group is further preferable. "a" and "b" are positive numbers that satisfy a+b≤3.

The blended amount of the organohydrogenpolysiloxane (III) is adjusted according to the amount of alkenyl groups contained in the organopolysiloxane (II), and the molar ratio of SiH groups to alkenyl groups (H/Vi ratio) is preferably within the range of 0.40 to 11.0. Considering the formation of a cured film and the release properties thereof, the blended amount of the organohydrogenpolysiloxane (III) can be set within the range of 1 to 30 parts by mass relative to 100 parts by mass of the organopolysiloxane (II). When the blended amount is 1 part by mass or more, curability is enhanced, and when the blended amount is 30 parts by mass or less, release force does not exceed practical limits. A range of 1 to 15 parts by mass is more preferable.

[Surfactant (IV)]

The inventive addition reaction-curable silicone emulsion composition can contain a surfactant (IV). Examples of the surfactant (IV) of the present invention include nonionic types such as alkyl ether types including polyoxyethylene lauryl ether, polyoxyethylene styrenated phenyl ether, polyoxyethylene tridecyl ether, and the like; and alkyl ester types including polyoxyethylene oleate, polyoxyethylene laurate, and the like. Polyoxyethylene lauryl ether and polyoxyethylene styrenated phenyl ether are preferable. One of these nonionic emulsifiers can be used alone or a combination of two or more thereof can be used. In order to obtain a stable silicone emulsion composition, it is desirable for the nonionic emulsifier alone or a mixture thereof to have HLB of 10 to 15.

In addition, an anionic surfactant or a cationic surfactant can also be used, but it is desirable to use together with a nonionic surfactant from the aspects of stability of the silicone emulsion and wettability to substrates. Examples of the anionic surfactant include a higher alcohol sulfuric ester salt, an alkyl phenyl ether sulfuric ester salt, an alkylbenzenesulfonate, a higher alcohol phosphoric ester salt, an ethoxylated higher alcohol sulfuric ester salt, an ethoxylated higher alcohol phosphate, and the like. Examples of the cationic surfactant include an alkyltrimethylammonium chloride, an alkylamine hydrochloride, an alkylamine acetate, an alkylbenzenedimethylammonium chloride, and the like.

It is desirable for the blended amount of the surfactant to be the minimum amount at which sufficient stability of the silicone emulsion and wettability to substrates can be obtained. Specifically, the blended amount is 0.1 to 20 parts by mass relative to 100 parts by mass of the total amount of the organopolysiloxane (II) and the organohydrogenpolysiloxane (III), preferably 0.5 to 15 parts by mass. When the amount is 0.1 mass or more, emulsification becomes easy, and when the amount is 20 parts by mass or less, the curability of the silicone emulsion is enhanced.

In order to help emulsification and enhance stability, a water-soluble resin can be used along with the surfactant. Examples of the water-soluble resin include a polyvinyl alcohol, cellulose derivatives, Carbopol, and the like, and a polyvinyl alcohol is more preferable. This water-soluble resin may function as a thickener. It is preferable to select one having a minimal poisoning action to the platinum group metal-based catalyst (V). Like the surfactant, it is desirable for the blended amount to be the minimum amount at which sufficient stability of the silicone emulsion and sufficient wettability to substrates can be achieved. Specifically, the amount is preferably 1 to 10 parts by mass relative to 100 parts by mass of the total amount of the organopolysiloxane (II) and the organohydrogenpolysiloxane (III).

[Platinum Group Metal-Based Catalyst (V)]

The inventive addition reaction-curable silicone emulsion composition can contain a platinum group metal-based catalyst (V). The platinum group metal-based catalyst (V) is a catalyst for promoting addition reaction, and a known addition reaction catalyst can be used. Examples of such a platinum group metal-based catalyst include platinum-based, palladium-based, rhodium-based, and ruthenium-based catalysts and the like, and in particular, platinum-based catalysts are preferably used. Examples of the platinum-based catalyst include chloroplatinic acid, an alcohol solution or aldehyde solution of chloroplatinic acid, and complexes of chloroplatinic acid with olefins or vinylsiloxanes.

The platinum group metal-based catalyst is added in a catalytic amount, and from the standpoints of obtaining a favorable cured film and economy, the amount is preferably within the range of 1 to 1000 ppm of platinum group metal relative to the total mass of the organopolysiloxane (II) and the organohydrogenpolysiloxane (III).

[Water (VI)]

The inventive addition reaction-curable silicone emulsion composition can contain water (VI). The amount of the water (VI) is adjusted so as provide a viscosity suitable for the application apparatus to be actually used and a desired silicone coating amount on the substrate, and is not particularly limited. However, the amount is preferably 100 to 10000 parts by mass relative to 100 parts by mass of the organopolysiloxane (II). When the amount is 100 parts by weight or more, an O/W-type emulsion can be easily obtained, and when the amount is 10000 parts by mass or less, stability of the emulsion can be maintained.

Water having an impurity concentration as in tap water may be used sufficiently, and water that does not contain strong acid, strong alkali, a large amount of alcohol, or salts, etc. is preferable since stability of the emulsion can be maintained.

[Other Components]

Besides the above-described components, the inventive addition reaction-curable silicone emulsion composition can contain optional components. Examples of the optional components include catalysis inhibitors (controllers) for inhibiting the catalytic activity of platinum group metal-based catalysts, selected from organic nitrogen compounds, organic phosphorus compounds, acetylene-based compounds, oxime compounds, organochlorine compounds, and the like. Examples include acetylene-based alcohols such as 3-methyl-1-butyne-3-ol, 3,5-dimethyl-1-hexyne-3-ol, 3-methyl-1-pentene-3-ol, phenylbutynol, and the like; acetylene-based compounds such as 3-methyl-3-1-penten-1-yne, 3,5-dimethyl-1-hexyne-3-yne; a reaction product of these acetylene-based compounds and an alkoxysilane, a siloxane, or a hydrogensilane; vinylsiloxanes such as a cyclic tetramethylvinylsiloxane and the like; organic nitrogen compounds such as a benzotriazole and the like; and organic phosphorus compounds, oxime compounds, organochromium compounds, and the like.

In addition, in order to control release properties, it is possible to add silicone resins, silica, or organopolysiloxanes having no hydrogen atoms or alkenyl groups attached to silicon atoms; leveling agents such as fluorochemical surfactants; thickeners such as water-soluble polymers, for example methyl cellulose and polyvinyl alcohol; and the like as necessary. Note that the amounts of the optional components to be added can be set according to necessity.

[Method for Producing Silicone Emulsion Composition]

Known methods can be employed for producing the inventive addition reaction-curable silicone emulsion composition. When the composition contains the above components (I) to (VI), it is preferable to, for example, mix predetermined amounts of the components (I) to (IV) and part of the water (VI) by using a high-shear agitating apparatus such as a planetary mixer, a combination mixer, or a high-pressure homogenizer, emulsifying the mixture by phase inversion method, and adding the remainder of the water (VI) for dilution. One of each component can be used or two or more thereof can be used together.

The water-soluble silane coupling agent (I) can be added by various methods such as a method of adding to an emulsion solution containing the above (II) to (IV); a method of adding to an emulsion solution containing the above (II) to (VI); adding water to obtain an aqueous solution and then adding; self-emulsification prescription; and a method of blending as a starting material when producing an emulsion solution containing the above (II) to (IV).

It is desirable to form an emulsion of the above (I) to (IV), and then add the platinum group metal-based catalyst (V) immediately before using this emulsion, rather than emulsifying the platinum group metal-based catalyst (V) simultaneously with the other components. The platinum group metal-based catalyst is preferably processed into a water dispersible form before being added. For example, a method of mixing with the surfactant (IV) beforehand and a method of forming an emulsion together by the above-described method are effective.

[Delamination Film]

The silicone emulsion composition thus prepared can be applied to a plastic film and heat cured to obtain a delamination film which is ready for use.

Examples of the plastic film include polyolefin films such as biaxially oriented polypropylene films, polyethylene films, and ethylene-propylene copolymer films, and polyester films such as polyethylene terephthalate films. The thickness of these film substrates is not restricted, but usually, about 5 to 100 μm can be applicable.

In order to apply the inventive composition to a substrate, a gravure coater, air knife coater, roll coater, wire bar or the like may be used. The coating amount is not particularly restricted, but is often about 0.1 to 2.0 $g/m^2$ of silicone solids, preferably 0.1 to 1.0 $g/m^2$.

After applying the inventive composition, the coated substrate can be heated at 80° C. to 160° C. for about 5 seconds to 3 minutes in a hot air circulation dryer, for example, for forming a cured film of silicone on the substrate, while imparting release properties. The film can be cured by irradiation with infrared or ultraviolet radiation, and combination of these techniques can improve curing efficiency.

As described, the inventive addition reaction-curable silicone emulsion composition allows a cured film that is excellent in curability and that can be adhered well to a plastic film substrate regardless of the type of the film substrate. Further, this cured film can be used for a delamination film since the cured film has suitable release properties regarding adhesives. Furthermore, a delamination film obtained by applying the above-described silicone emulsion composition to a plastic film and curing. The delamination film has a cured film that adheres well to plastic film substrates while having suitable release properties regarding adhesives, and therefore, has high practicality. Moreover, a cured film of silicone can be formed on the substrate by, after applying the inventive composition, heating the coated substrate at 80° C. to 160° C. for about 5 seconds to 3 minutes. Therefore, a delamination film imparted with release properties can be produced easily without using an expensive apparatus, and without going through a complicated process.

EXAMPLE

Hereinafter, the present invention will be specifically described with reference to Examples and Comparative Examples. However, the present invention is not limited thereto.

Next, Examples and Comparative Examples of the present invention will be given. Parts in the Examples indicate parts by mass, and in the Examples, the physical properties in the tables are measured by the test methods described below. In addition, viscosity means absolute viscosity unless otherwise indicated.

[Curability]

Regarding curability, immediately after preparation of a silicone emulsion composition, the siloxane composition was applied to a PET film (DIAFOIL 38 μm, product name, manufactured by Mitsubishi Chemical Corporation) substrate so as to achieve 0.25 $g/m^2$, and heated in a hot air dryer at 150° C. for a predetermined time. The formed cured film was rubbed several times with the finger, and visually observed and evaluated whether or not it was smeared and rubbed off. Curability has been represented by the time (seconds) required for curing.

[Adhesiveness]

Immediately after preparation of a silicone emulsion composition, the siloxane composition was applied to each film substrate so as to achieve 0.25 $g/m^2$, and heated in a hot air dryer at 150° C. for a predetermined time. The formed cured film was rubbed several times with the finger, and visually observed whether or not it was smeared and rubbed off. This has been reported as adhesiveness.

[Release Force]

Immediately after preparation, a silicone emulsion composition was cured at 150° C. for 30 seconds by the same method as the curability test. An adhesive tape (Tesa 7475 tape, product name, manufactured by Tesa Tape. Inc.) with a width of 25 mm was attached thereto, and aged at room temperature for one day. Then, the adhesive tape attached to the sample was peeled using a tensile tester at an angle of 180° at a rate of 0.3 m/min. The force (N/2.5 cm) required for peeling was measured.

[Adhesion Retentivity]

A cured film of a silicone emulsion composition was formed in the same manner as with the release force. A polyester adhesive tape (Nitto 31B, product name, manufactured by Nitto Denko Co., Ltd.) was attached to the surface of the cured film, placed under a load of 1976 Pa, and heat treated at 70° C. for 20 hours. Thereafter, the tape was removed and attached to a stainless steel plate, and subsequently, the force (N/2.5 cm) required to peel the treated tape from the stainless steel plate was measured. A percentage of this force to the force required to peel an untreated standard tape has been reported as adhesion retentivity.

[Preparation of Emulsion Composition]

Silicone Emulsion 1

A 5-liter combined emulsifier apparatus (K. T. Combi Mix M model, product name, manufactured by PRIMIX Corporation) including an anchor mixer capable of agitation throughout the vessel and a rotatable disk having small tooth-like protrusions arranged alternately in the upward and downward direction along the periphery was charged with: 100 parts by mass of a siloxane (IIa) composed of 1.9 mol % of a dimethylvinylsiloxane unit represented by $(CH_3)_2(CH_2=CH)SiO_{1/2}$, 97.5 mol % of a dimethylsiloxane unit represented by $(CH_3)_2SiO_{2/2}$, and 0.6 mol % of a methylsiloxane unit represented by $CH_3SiO_{3/2}$, and having a viscosity of 252 mPa·s and a vinyl group content of 0.027 mol/100 g as an organopolysiloxane (II); 3.58 parts by mass of a methylhydrogenpolysiloxane (IIIa) composed of 2 mol % of a trimethylsiloxane unit represented by $(CH_3)_3SiO_{1/2}$, 28 mol % of a dimethylsiloxane unit represented by $(CH_3)_2SiO_{2/2}$, and 70 mol % of a methylhydrogensiloxane unit represented by $(CH_3)HSiO_{2/2}$, and having a viscosity of 122.2 mPa·s and an H group content of 1.080 mol/100 g as an organohydrogenpolysiloxane (III); 0.78 parts by mass of a polyoxyethylene lauryl ether (HLB of 13.6) as a surfactant (IV); 51.95 parts by mass of a 10% polyvinyl alcohol aqueous solution as a water-soluble resin (thickener); and 0.39 parts by mass of an ethynyl cyclohexanol as a catalysis inhibitor. The mixture was agitated and mixed until uniform, and phase inversion was induced, followed by 15 minutes of agitation. Subsequently, 103.04 parts of water (VI) was added as a water diluent and agitated to obtain an O/W type emulsion 1 having a silicone content of 40%.

Silicone Emulsion 2

In the same manner as the silicone emulsion 1, the following were charged: as the organopolysiloxane (II), 46.45 parts by mass of a siloxane (IIb) composed of 50 mol % of a dimethylvinylsiloxane unit represented by $(CH_3)_2(CH_2=CH)SiO_{1/2}$ and 50 mol % of a methylsiloxane unit represented by $CH_3SiO_{3/2}$, and having a viscosity of 30 mPa·s and a vinyl group content of 0.60 mol/100 g, 15.83 parts by mass of a siloxane (IIc) having vinyl groups on terminals and side chains composed of 0.03 mol % of a dimethylvinylsiloxane unit represented by $(CH_3)_2(CH_2=CH)SiO_{1/2}$, 93.2 mol % of a dimethylsiloxane unit represented by $(CH_3)_2SiO_{2/2}$, 1.80 mol % of a diphenylsiloxane unit represented by $(C_6H_5)_2SiO_{2/2}$, and 4.97 mol % of a methylvinylsiloxane unit represented by $(CH_3)(CH_2=CH)SiO_{2/2}$, and having 30% toluene diluted viscosity of 5000 mPa·s and a vinyl group content of 0.070 mol/100 g, and 37.72 parts by mass of a dimethylpolysiloxane (IId) having vinyl groups on both terminals composed of 1.4 mol % of a dimethylvinylsiloxane unit represented by $(CH_3)_2(CH_2=CH)SiO_{1/2}$ and 98.6 mol % of a dimethylsiloxane unit represented by $(CH_3)_2SiO_{2/2}$, and having a viscosity of 400 mPa·s and a vinyl group content of 0.02 mol/100 g; as the organohydrogenpolysiloxane (III), 20.95 parts by mass of a methylhydrogenpolysiloxane (IIIa) composed of 2 mol % of a trimethylsiloxane unit represented by $(CH_3)_3SiO_{2/2}$, 28 mol % of a dimethylsiloxane unit represented by $(CH_3)_2SiO_{2/2}$, and 70 mol % of a methylhydrogensiloxane unit represented by $(CH_3)HSiO_{2/2}$, and having a viscosity of 122.2 mPa·s and an H group content of 1.08 mol/100 g, and 16.34 parts by mass of a siloxane (IIIb) composed of 5 mol % of a trimethylsiloxane unit represented by $(CH_3)_3SiO_{2/2}$ and 95 mol % of a methylhydrogensiloxane unit represented by $(CH_3)HSiO_{2/2}$, and having a viscosity of 20.13 mPa·s and an H group content of 1.6 mol/100 g; 1.34 parts by mass of a polyoxyethylene lauryl ether (HLB of 13.6) as the surfactant (IV); 67.4 parts by mass of a 10% polyvinyl alcohol aqueous solution as the water-soluble resin (thickener); and 0.84 parts by mass of an ethynyl cyclohexanol as the catalysis inhibitor. The mixture was agitated and mixed until uniform. 190.56 parts by mass of water was added to this mixture as a water diluent and agitated to obtain an O/W type emulsion 2 having a silicone content of 41%.

Platinum Catalyst Emulsion 3

In the same manner as the silicone emulsion 1, a vinylsiloxane complex of a chloroplatinic acid was emulsified, and an O/W type emulsion 3 having 150 ppm of platinum relative to the silicone content was obtained.

[Synthesis of Water-Soluble Silane Coupling Agent]

Note that in the following description, the viscosity was measured with an Ostwald viscometer at 25° C., and the non-volatile content was measured by a non-volatile residue test method after drying by heating at 105° C. for 3 hours on an aluminum petri dish.

[Synthesis Example 1] Synthesis of Water-Soluble Silane Coupling Agent (Ic)

In a 300-mL separable flask equipped with an agitator, a reflux condenser, an ester adapter, and a thermometer were charged 200 g of water, 1.0 g of acetic acid, 28.5 g of 3-glycidoxypropyltrimethoxysilane, and 50.0 g of a 50 mass % solution of n-octadecyl dimethyl[3-(trimethoxysilyl) propyl] ammonium chloride in methanol, and were heated to 120° C. 95 g of a mixture of water and methanol generated by hydrolysis was distilled off under normal pressure to obtain a water-soluble silane coupling agent (Ic).

The obtained reaction product had a viscosity of 17.4 $mm^2/s$ and a non-volatile content of 31 mass %, and corresponds to a water-soluble silane coupling agent containing a quaternary ammonium group and a hydroxy group.

[Synthesis Example 2] Synthesis of Water-Soluble Silane Coupling Agent (Id)

In a 500-mL separable flask equipped with an agitator, a reflux condenser, an ester adapter, and a thermometer were charged 300 g of water, 55.3 g of 3-aminopropyltriethoxysilane, and 132 g of a 50 mass % solution of 3-ureidopropyltriethoxysilane in methanol, and were heated to 120° C. 230 g of a mixture of water and methanol and ethanol generated by hydrolysis was distilled off under normal pressure to obtain a water-soluble silane coupling agent (Id).

The obtained reaction product had a viscosity of 15.7 $mm^2/s$ and a non-volatile content of 29 mass %, and corresponds to a water-soluble silane coupling agent containing a ureido group and an amino group.

Example 1

The silicone emulsion 1 was diluted with water, the platinum catalyst emulsion 3 (150 ppm of platinum relative to the silicone content) and 1.0 parts of a water-soluble silane coupling agent (Ib) represented by the following formula manufactured by Shin-Etsu Chemical Co., Ltd. were blended, and thoroughly mixed. The resultant was used as a silicone emulsion composition, and curability, adhesiveness, release force, and adhesion retentivity were measured. The results are shown in Table 3.

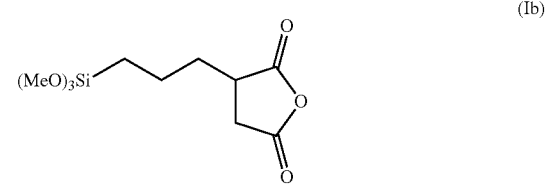

Example 2

The silicone emulsion 1 was diluted with water, the platinum catalyst emulsion 3 (150 ppm of platinum relative to the silicone content) and 5.0 parts of the silane coupling agent (Ib) were blended, and thoroughly mixed. The resultant was used as a silicone emulsion composition, and curability, adhesiveness, release force, and adhesion retentivity were measured. The results are shown in Table 3.

Example 3

The silicone emulsion 1 was diluted with water, the platinum catalyst emulsion 3 (150 ppm of platinum relative to the silicone content) and 12.0 parts of silane coupling agent (Ib) were blended, and thoroughly mixed. The resultant was used as a silicone emulsion composition, and curability, adhesiveness, release force, and adhesion retentivity were measured. The results are shown in Table 3.

Example 4

The silicone emulsion 1 was diluted with water, the platinum catalyst emulsion 3 (150 ppm of platinum relative to the silicone content) and 20.0 parts of the silane coupling agent (Ib) were blended, and thoroughly mixed. The resultant was used as a silicone emulsion composition, and curability, adhesiveness, release force, and adhesion retentivity were measured. The results are shown in Table 3.

Example 5

The silicone emulsion 1 was diluted with water, the platinum catalyst emulsion 3 (150 ppm of platinum relative to the silicone content) and 5.0 parts of the silane coupling agent (Ic) were blended, and thoroughly mixed. The resultant was used as a silicone emulsion composition, and curability, adhesiveness, release force, and adhesion retentivity were measured. The results are shown in Table 3.

Example 6

The silicone emulsion 1 was diluted with water, the platinum catalyst emulsion 3 (150 ppm of platinum relative to the silicone content) and 12.0 parts of the silane coupling agent (Ic) were blended, and thoroughly mixed. The resultant was used as a silicone emulsion composition, and curability, adhesiveness, release force, and adhesion retentivity were measured. The results are shown in Table 3.

Example 7

The silicone emulsion 1 was diluted with water, the platinum catalyst emulsion 3 (150 ppm of platinum relative to the silicone content) and 5.0 parts of the silane coupling agent (Id) were blended, and thoroughly mixed. The resultant was used as a silicone emulsion composition, and curability, adhesiveness, release force, and adhesion retentivity were measured. The results are shown in Table 4.

Example 8

The silicone emulsion 1 was diluted with water, the platinum catalyst emulsion 3 (150 ppm of platinum relative to the silicone content) and 12.0 parts of the silane coupling agent (Id) were blended, and thoroughly mixed. The resultant was used as a silicone emulsion composition, and curability, adhesiveness, release force, and adhesion retentivity were measured. The results are shown in Table 4.

Comparative Example 1

The silicone emulsion 1 was diluted with water, the platinum catalyst emulsion 3 (150 ppm of platinum relative to the silicone content) was blended, and thoroughly mixed. The resultant was used as a silicone emulsion composition, and curability, adhesiveness, release force, and adhesion retentivity were measured. The results are shown in Table 4.

Comparative Example 2

The silicone emulsion 1 was diluted with water, the platinum catalyst emulsion 3 (150 ppm of platinum relative to the silicone content) and silane coupling agent (e) shown by the following formula/1.0 mol/L acetic acid aqueous solution=2/0.16 (mass ratio) were blended so that there were 5.0 parts of (e), and thoroughly mixed. The resultant was used as a silicone emulsion composition, and curability, adhesiveness, release force, and adhesion retentivity were measured. The results are shown in Table 4.

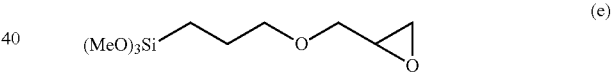

(e)

Comparative Example 3>(cf. Patent Document 6)

The silicone emulsion 2 was diluted with water, the platinum catalyst emulsion 3 (150 ppm of platinum relative to the silicone content) was blended, and thoroughly mixed. The resultant was used as a silicone emulsion composition, and curability, adhesiveness, release force, and adhesion retentivity were measured. The results are shown in Table 4.

Tables 1 and 2 show the compositions of the Examples and Comparative Examples.

TABLE 1

| Components | Example 1 | Example 2 | Example 3 | Example 4 | Example 5 | Example 6 |
|---|---|---|---|---|---|---|
| Organo-polysiloxane (II) | 100 | 100 | 100 | 100 | 100 | 100 |
| Water-soluble silane coupling agent (I) | (Ib) 1 | (Ib) 5 | (Ib) 12 | (Ib) 20 | (Ic) 5 | (Ic) 12 |

TABLE 1-continued

| Components | Example 1 | Example 2 | Example 3 | Example 4 | Example 5 | Example 6 |
|---|---|---|---|---|---|---|
| Organohydrogenpolysiloxane (III) | 3.58 | 3.58 | 3.58 | 3.58 | 3.58 | 3.58 |
| Surfactant (IV) (Note 1) | 0.75 | 0.75 | 0.75 | 0.75 | 0.75 | 0.75 |
| Platinum group metal-based catalyst (V) (Note 2) | 150 | 150 | 150 | 150 | 150 | 150 |
| Water (VI) | 1968 | 1968 | 1968 | 1968 | 1968 | 1968 |
| Water-soluble resin polyvinyl alcohol (Note 1) | 5.02 | 5.02 | 5.02 | 5.02 | 5.02 | 5.02 |
| Ethynyl cyclohexanol | 0.39 | 0.39 | 0.39 | 0.39 | 0.39 | 0.39 |

(Note 1):
parts by mass relative to 100 parts by mass of (II) + (III)

(Note 2):
ppm relative to the mass of (II) + (III)

TABLE 2

| Components | Example 7 | Example 8 | Comparative Example 1 | Comparative Example 2 | Comparative Example 3 |
|---|---|---|---|---|---|
| Organopolysiloxane (II) | 100 | 100 | 100 | 100 | 100 |
| Water-soluble silane coupling agent (I) | (Id) 5 | (Id) 12 | — | (e) 5 (Note 3) | — |
| Organohydrogenpolysiloxane (III) | 3.58 | 3.58 | 3.58 | 3.58 | 37.29 |
| Surfactant (IV) (Note 1) | 0.75 | 0.75 | 0.75 | 0.75 | 1.34 |
| Platinum group metal-based catalyst (V) (Note 2) | 150 | 150 | 150 | 150 | 150 |
| Water (VI) | 1968 | 1968 | 1968 | 1968 | 769 |
| Water-soluble resin polyvinyl alcohol (Note 1) | 5.02 | 5.02 | 5.02 | 5.02 | 6.74 |
| Ethynyl cyclohexanol | 0.39 | 0.39 | 0.39 | 0.39 | 0.84 |

(Note 1):
parts by mass relative to 100 parts by mass of (II) + (III)

(Note 2):
ppm relative to the mass of (II) + (III)

(Note 3):
added as an aqueous solution of (e)/1.0 mol/L acetic acid aqueous solution = 2/0.16 (mass ratio).

TABLE 3

| Measured items | Substrate | Example 1 | Example 2 | Example 3 | Example 4 | Example 5 | Example 6 |
|---|---|---|---|---|---|---|---|
| Curability (seconds) | PET (Note 1) | 30 | 30 | 30 | 30 | 30 | 30 |
| Adhesiveness (Note 2) | | Good | Good | Good | Good | Good | Good |
| Release force (N/2.5 cm) | | 0.11 | 0.13 | 0.13 | 0.13 | 0.09 | 0.10 |
| Adhesion retentivity (%) | | 98 | 98 | 99 | 100 | 94 | 98 |

(Note 1):
PET = polyester film (Note 2):
adhesiveness is rated "Good" for no rub-off, and "Poor" for rub-off.

TABLE 4

| Measured items | Substrate (Note 1) | Example 7 | Example 8 | Comparative Example 1 | Comparative Example 2 | Comparative Example 3 |
|---|---|---|---|---|---|---|
| Curability (seconds) | PET (Note 1) | 30 | 30 | 30 | 30 | 30 |
| Adhesiveness (Note 2) | | Good | Good | Poor | Poor | Good |
| Release force (N/2.5 cm) | | 0.10 | 0.06 | 0.12 | 0.17 | 0.22 |
| Adhesion retentivity (%) | | 83 | 81 | 100 | 93 | 100 |

(Note 1):
PET = polyester film
(Note 2):
adhesiveness is rated "Good" for no rub-off, and "Poor" for rub-off.

It was revealed from Examples 1 to 8 that a cured film obtained by curing the inventive addition reaction-curable silicone emulsion composition adheres well to a film substrate. That is, it was revealed from Examples 1 to 8 and Comparative Example 1, that good adhesiveness can be achieved by adding silane coupling agents (Ib), (Ic), and (Id), and it was revealed from Examples 1 to 8 and Comparative Example 2 that sufficient adhesiveness cannot be achieved by adding the epoxy group-containing silane coupling agent (e). In addition, it was revealed from Examples 1 to 8 and Comparative Example 3 (cf. Patent Document 6), that in conventional art, a large amount of organopolysiloxane containing a large amount of trifunctional siloxane units and alkenyl groups is contained as an adhesion exhibiting component, and that it has been difficult to achieve a sufficiently light release to adhesives (make it easier to peel) when attempting to raise adhesiveness further. However, a cured film obtained by curing the inventive addition reaction-curable silicone emulsion composition having silane coupling agents (Ib), (Ic), and (Id) added can maintain sufficient adhesiveness to plastic substrates, while achieving a sufficiently light release to adhesives.

As described above, the inventive addition reaction-curable silicone emulsion composition allows a cured film that is excellent in curability and that can be adhered well to a plastic film substrate regardless of the type of the film substrate. Furthermore, this cured film can be used for a delamination film since the cured film has suitable release properties regarding adhesives. Furthermore, a delamination film obtained by applying the above-described silicone emulsion composition to a plastic film and curing has a cured film formed that adheres well to plastic film substrates while having suitable release properties regarding adhesives, and therefore, has high practicality. Moreover, a cured film of silicone can be formed on the substrate by, after applying the inventive composition, heating the coated substrate under relatively mild conditions. Therefore, a delamination film imparted with release properties can be produced easily without using an expensive apparatus, and without going through a complicated process.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. An addition reaction-curable silicone emulsion composition comprising:
    a water-soluble silane coupling agent (I) having:
        (i) one or more groups selected from a quaternary ammonium group and a ureido group; and
        (ii) one or more groups selected from a hydroxy group, a carboxylic acid group, and an amino group; and
    an organopolysiloxane (II) having two or more alkenyl groups in one molecule thereof,
    wherein 1 part by mass or more of the water-soluble silane coupling agent (I) is contained relative to 100 parts by mass of the organopolysiloxane (II).

2. The addition reaction-curable silicone emulsion composition according to claim 1, comprising:
    (1) 1 to 20 parts by mass of the water-soluble silane coupling agent (I),
    (2) 100 parts by mass of the organopolysiloxane (II) represented by the following general formula (II-1) and having absolute viscosity at 25° C. within a range of 10 mPa·s to 50000 mPa·s with 30% toluene diluted viscosity,

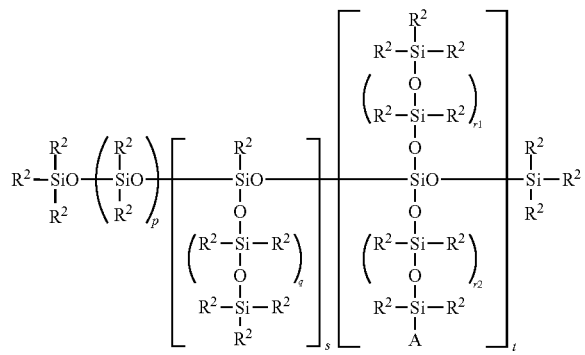

(II-1)

wherein:
    each $R^2$ is the same or different, and represents a group selected from an unsubstituted or substituted monovalent hydrocarbon group having 1 to 20 carbon atoms and no aliphatic unsaturated bond and an alkenyl group having 2 to 12 carbon atoms optionally having an intervening oxygen atom, and two or more of the $R^2$ represent alkenyl groups; and
    "p", "q", r1, r2, "s", and "t" satisfy $10 \leq p \leq 30{,}000$, $0 \leq q \leq 500$, $0 \leq r1 \leq 500$, $0 \leq r2 \leq 500$, and $0 \leq s+t \leq 20$, (3) 1 to 30 parts by mass of an organohydrogenpolysiloxane (III) having two or more hydrogen atoms directly bonded to a Si atom in one molecule thereof,
(4) 0.1 to 20 parts by mass of a surfactant (IV) relative to 100 parts by mass of a total amount of the organopolysiloxane (II) and the organohydrogenpolysiloxane (III),
(5) a catalytic amount of a platinum group metal-based catalyst (V), and
(6) 100 to 10000 parts by mass of water (VI).

3. A delamination film having a cured film of the addition reaction-curable silicone emulsion composition according to claim 2 formed on a plastic film.

4. A delamination film having a cured film of the addition reaction-curable silicone emulsion composition according to claim 1 formed on a plastic film.

* * * * *